United States Patent
Harris (10) Patent No.: US 9,114,288 B2
(45) Date of Patent: Aug. 25, 2015

(54) MAGNETIC RETRIEVAL SYSTEM FOR A GOLF CLUB

(71) Applicant: Terry Harris, Cordova, TN (US)

(72) Inventor: Terry Harris, Cordova, TN (US)

( * ) Notice: Subject to any disclaimer, the term of this patent is extended or adjusted under 35 U.S.C. 154(b) by 0 days.

(21) Appl. No.: 13/850,303

(22) Filed: Mar. 26, 2013

(65) Prior Publication Data

US 2013/0216350 A1      Aug. 22, 2013

Related U.S. Application Data

(63) Continuation of application No. 13/111,162, filed on May 19, 2011, now Pat. No. 8,424,943.

(51) Int. Cl.
   *A63B 57/00*      (2006.01)
   *B25J 1/04*      (2006.01)

(52) U.S. Cl.
   CPC ............. *A63B 57/00* (2013.01); *A63B 57/0075* (2013.01); *B25J 1/04* (2013.01); *A63B 2209/08* (2013.01)

(58) Field of Classification Search
   CPC ... A63B 57/0075; A63B 2209/08; B25J 1/04; H01F 7/0257
   USPC ................ 294/190, 65.5, 19.2; 473/285, 286; 411/387.7, 387.8
   See application file for complete search history.

(56) References Cited

U.S. PATENT DOCUMENTS

| | | | |
|---|---|---|---|
| 2,178,872 A | 11/1939 | Engstrom | |
| 2,732,243 A * | 1/1956 | Mount | 294/65.5 |
| 2,979,335 A | 4/1961 | Pruitt | |
| 4,017,082 A * | 4/1977 | Channing et al. | 473/285 |
| 5,516,248 A * | 5/1996 | DeHaitre | 411/387.2 |
| 5,795,242 A | 8/1998 | Ree | |
| 6,142,719 A | 11/2000 | Daubinger | |
| 6,899,635 B2 * | 5/2005 | Nadratowski et al. | 473/285 |
| 7,857,707 B2 | 12/2010 | Beppu | |
| 8,424,943 B2 * | 4/2013 | Harris | 294/190 |
| 2006/0264267 A1 | 11/2006 | Fox | |
| 2007/0049396 A1 | 3/2007 | Scheibe | |
| 2007/0243945 A1 | 10/2007 | Hoium et al. | |
| 2007/0298900 A1 * | 12/2007 | Johnson | 473/286 |
| 2010/0105498 A1 | 4/2010 | Johnson | |

FOREIGN PATENT DOCUMENTS

GB      2366832      3/2002

* cited by examiner

*Primary Examiner* — Dean Kramer
(74) *Attorney, Agent, or Firm* — Martino Patent Law at the Law Offices of Sepehr Daghighian (57) ABSTRACT

A magnetic retrieval device includes a magnet and a helical thread fixed relative to the magnet. The helical thread is screwed onto a proximal end of a grip of a golf club. The golf club can be used by a golfer to retrieve a laying golf club already on a playing surface without the need for the golfer to bend over or bend down. The helical thread may include a pointed distal end and a cutting slot or a drill distal end. A body may surround the magnet, where the body includes a base and a top. The top may include an elastomeric material such as rubber. A metallic ball marker may be magnetically attached to the body.

20 Claims, 9 Drawing Sheets

MAGNETIC RETRIEVAL SYSTEM FOR A GOLF CLUB

CROSS REFERENCE TO RELATED APPLICATIONS

This application is a continuation application of application Ser. No. 13/111,162 filed on May 19, 2011, the contents of which are incorporated herein in full with this reference.

DESCRIPTION

1. Field of the Invention

The present invention generally relates to golf. More particularly, the present invention relates to a magnetic retrieval system for a golf club.

2. Background of the Invention

Golf is a precision club-and-ball sport, in which competing players (golfers), using many types of clubs, attempt to hit balls into each hole on a golf course while making the fewest number of strokes. Golf is one of the few ball games that does not require a standardized playing area. Instead, the game is played on golf "courses," each of which features a unique design of 9 or 18 holes. Golf is defined, in the rules of golf, as "playing a ball with a club from the teeing ground into the hole by a stroke or successive strokes in accordance with the Rules." Golf competition is generally played for the lowest number of strokes by an individual, known simply as stroke play, or the lowest score on the most individual holes during a complete round by an individual or team, known as match play.

The origin of golf is unclear and open to debate. Some historians trace the sport back to the Roman game of paganica, in which participants used a bent stick to hit a stuffed leather ball. One theory asserts that paganica spread throughout Europe as the Romans conquered most of the continent, during the first century B.C., and eventually evolved into the modern game. Others cite chuiwan ("chui" means striking and "wan" means small ball) as the progenitor, a Chinese game played between the eighth and 14th centuries. A Ming Dynasty scroll dating back to 1368 entitled "The Autumn Banquet", shows a member of the Chinese Imperial court swinging what appears to be a golf club at a small ball with the aim of sinking it into a hole. The game is thought to have been introduced into Europe during the Middle Ages. Another early game that resembled modern golf was known as cambuca in England and chambot in France. This game was, in turn, exported to the Germany and England (where it was called pall-mall, pronounced "pell mell"). Some observers, however, believe that golf descended from the Persian game, chaugan. In addition, kolven (a game involving a ball and curved bats) was played annually in Loenen, Netherlands, beginning in 1297, to commemorate the capture of the assassin of Floris V, a year earlier. No matter where golf originated from, the modern game of golf came from Scotland, where the first written record of golf is James II's banning of the game in 1457.

Since the beginnings of golf, the sport has spread throughout the world. Today, millions of people play golf every year along a similar set of rules. The initial stroke on a hole is a long-distance shot intended to move the ball a great distance down the fairway, as this shot is commonly called a "drive." Shorter holes generally are initiated with "shorter" clubs. Once the ball comes to rest, the golfer strikes it again as many times as necessary using shots that are variously known as a lay-up, an approach, a "pitch," or a chip, until the ball reaches the green, where he or she then putts the ball into the hole (commonly called "sinking the putt"). The goal of getting the ball into the hole ("holing" the ball) in as few strokes as possible may be impeded by obstacles such as areas of long grass called rough (usually found alongside fairways) which both slows any ball that contacts it and makes it harder to advance a ball that has stopped on it, bunkers ("sand traps"), and water hazards. In most forms of gameplay, each player plays his or her ball until it is holed.

Golfers typically use a set of several clubs as they make their way around a course. When playing golf, it is very common for a club to placed upon the ground for a variety of reasons. A club may be placed on the ground to mark a ball or simply laid down when choosing between clubs. A club may fall to the ground mistakenly or even be thrown down in frustration. In either case, the club must be picked up. It can become tiresome to be repeatedly bending over to pick up a club. Also, many golfers are of an older age making it more difficult to bend down to pick up objects. Balance is difficult and a person may stumble and fall over. Also, joints don't bend as well as they did when one was younger. Accordingly, there is a need for a way to pick up a club and various other metallic objects without the need to bend over, which can be utilized on the golf course. The present invention fulfills these needs and provides other related advantages.

SUMMARY OF THE INVENTION

An exemplary magnetic retrieval device of the present invention is attachable to a grip of a golf club. The device includes a magnet and a helical thread fixed relative to the magnet. The helical thread is screwed onto a proximal end of the grip of the golf club. The golf club can be used by a golfer to retrieve a laying golf club already on a playing surface without the need for the golfer to bend over or bend down.

In an exemplary embodiment, the helical thread includes a pointed distal end. The helical thread may also include a thread-cutting screw type. The thread cutting screw type may include a cutting slot. The cutting slot is for cutting threads when the device is screwed onto the proximal end of the grip of the golf club.

In another exemplary embodiment, the helical thread includes a self-drilling thread type. The self-drilling thread type may include a drill distal end.

In an exemplary embodiment, the magnet may include a rare earth magnet. A body may surround the magnet. The body may comprise an elastomeric material, such as rubber. The body may include a base and a top. The top may include an elastomeric material. The helical thread may comprise a metallic material.

Furthermore, a metallic ball marker may be magnetically attached to the body, such that the ball marker is removable for use to mark the position of a golf ball.

In another exemplary embodiment, the base may include a hex-shaped recess joined to an aperture. The helical thread may include a screw with a hex head. The hex-shaped recess may cooperatively receive the hex head of the screw, such that the screw is securely held and cannot rotate relative to the base. The helical thread of the screw protrudes through the aperture. The device may be screwed manually into the proximal end of the grip of a golf club.

An exemplary method of picking up a laying golf club already on a playing surface is disclosed. The method includes attaching a magnetic retrieval device to a proximal end of a grip of a golf club. The device includes a magnet fixed relative to a helical thread, where the device is screwed onto the proximal end of the grip of the golf club. The method includes grabbing a club head end of the golf club and lowering the grip and attached device close to the laying golf club. This then allows the magnet to attract the laying golf club. The method then includes picking up the laying golf club without the need for a golfer to bend over or bend down to retrieve the laying golf club.

In exemplary embodiments, the helical thread comprises a pointed distal end and a cutting slot. A body may surround the magnet, where a portion of the body comprises an elastomeric material. The device may also include a metallic ball marker magnetically attached to the body, such that the ball marker is removable for use to mark the position of a golf ball and can be retrieved from the playing surface using the device.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
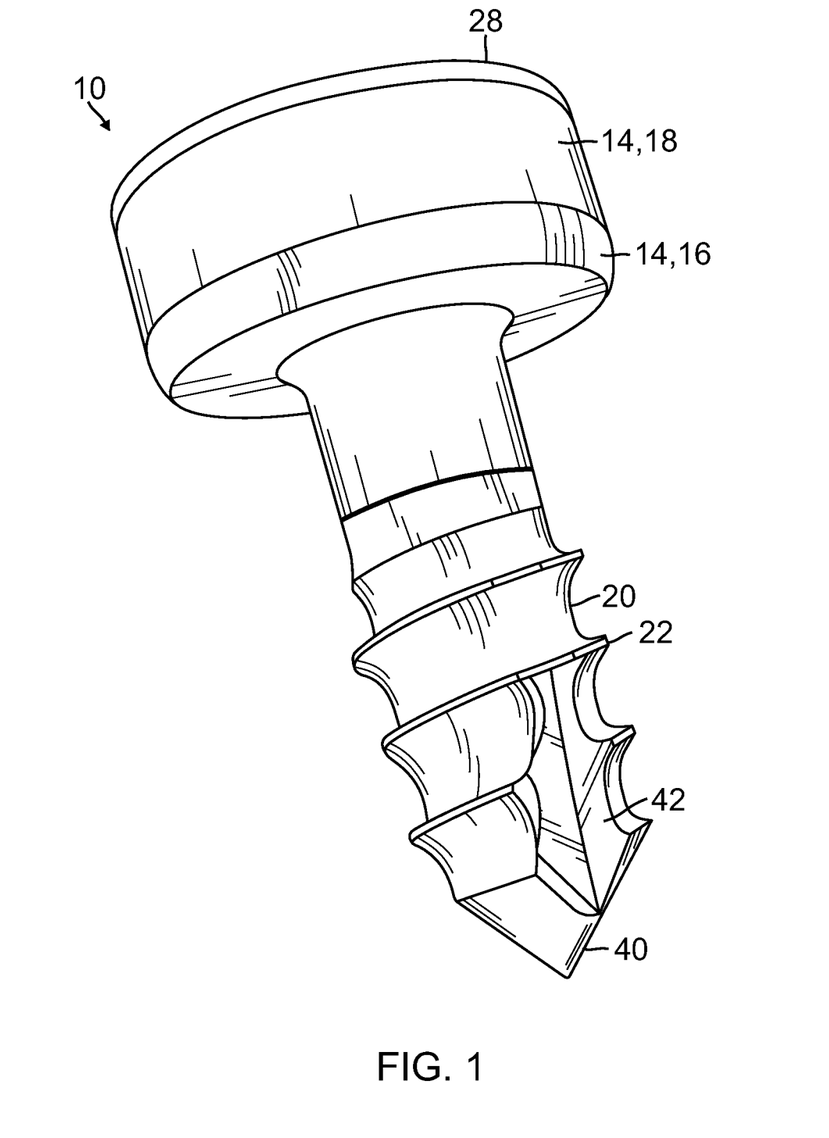
FIG. 1 is a perspective view of an exemplary magnetic retrieval device embodying the present invention.
Figure 2:
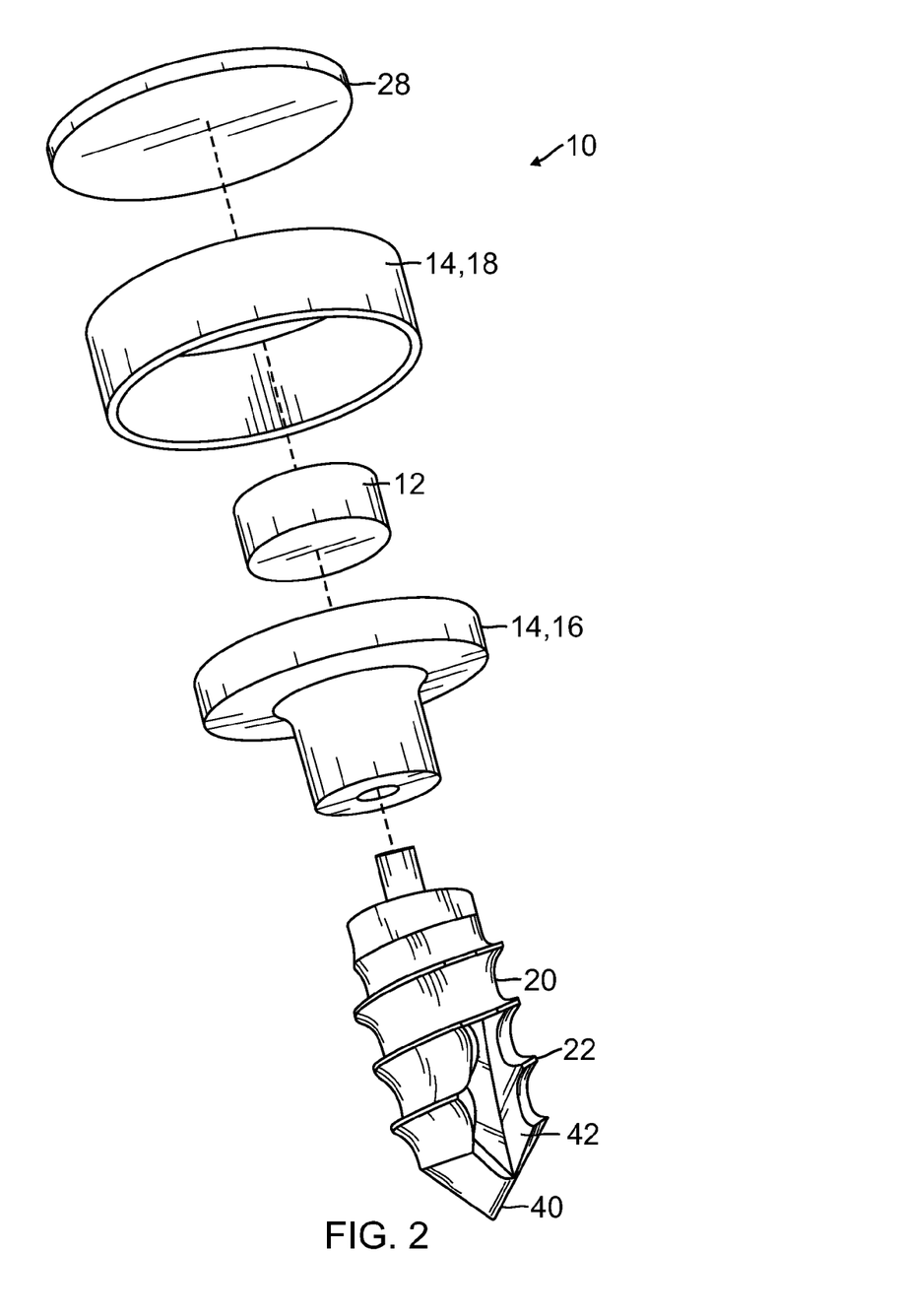
FIG. 2 is an exploded perspective view of the structure of FIG. 1.

FIG. 1 is a perspective view of an exemplary magnetic retrieval device 10 embodying the present invention. FIG. 2 is an exploded perspective view of the structure of FIG. 1. A magnet 12 is surrounded by a body 14. The magnet 12 may be a variety of magnet types, including a rare earth magnet. Rare earth magnets have extremely strong magnetic attractions despite their small size.

The body 14 may be formed in a multitude of designs and configurations. As shown in FIG. 2, the body 14 may be comprised of a base 16 and a top 18. The base 16 and top 18 cooperatively surround the magnet 12. The base 16 and top 18 may be welded, bonded, adhered or fastened together to encase the magnet 12. Alternatively, the base 16 and top 18 may be formed as a single unit in a molding process.

In an exemplary embodiment, the top 18 may be formed from a variety of elastomeric materials including rubber. The base may be similarly formed of a variety of materials, including plastics, metals composites and various combinations thereof.

A screw 20 is attached to the base 16. The screw 20 includes a helical thread 22. The screw 20 and helical thread 22 may be attached to the base 16 or formed as a single part.

The magnetic retrieval device 10 is then attachable to a grip 24 of a golf club 26. The golf club 26 can be used by a golfer 34 to retrieve a laying golf club 30 already on a playing surface 32 without the need for the golfer to bend over or bend down. Furthermore, a metallic ball marker 28 may be magnetically attached to the body 14, such that the ball marker 28 is removable for use to mark the position of a golf ball.

Figure 3:
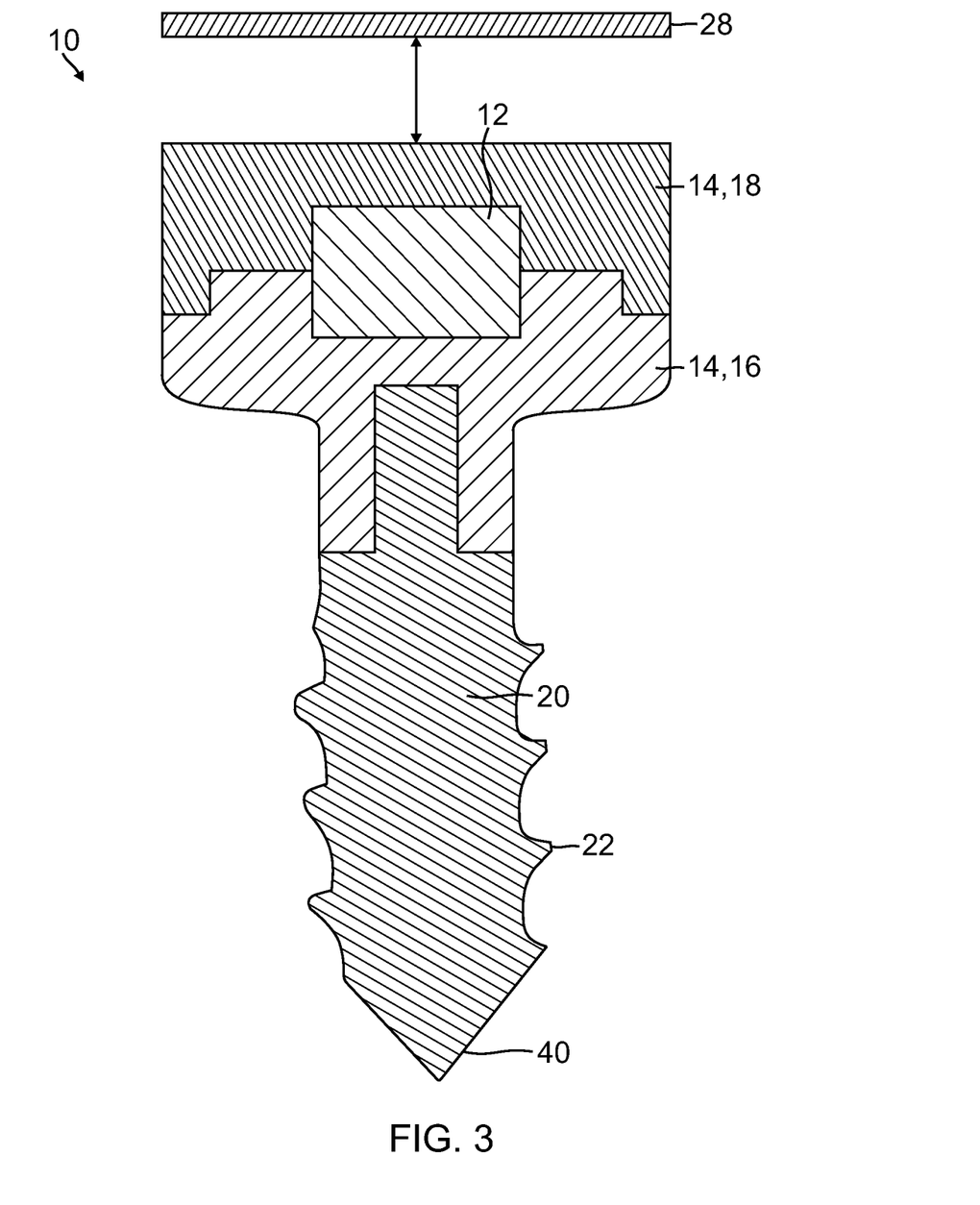
FIG. 3 is a cross-sectional view of the structure of FIG. 1.

FIG. 3 is a cross-sectional view of the structure of FIG. 1, showing how the ball marker 28 may be magnetically attached to the top 18 of the body 14. Also shown is how the top 18 and base 16 cooperate to secure the magnet 12 in place.

Figure 4:
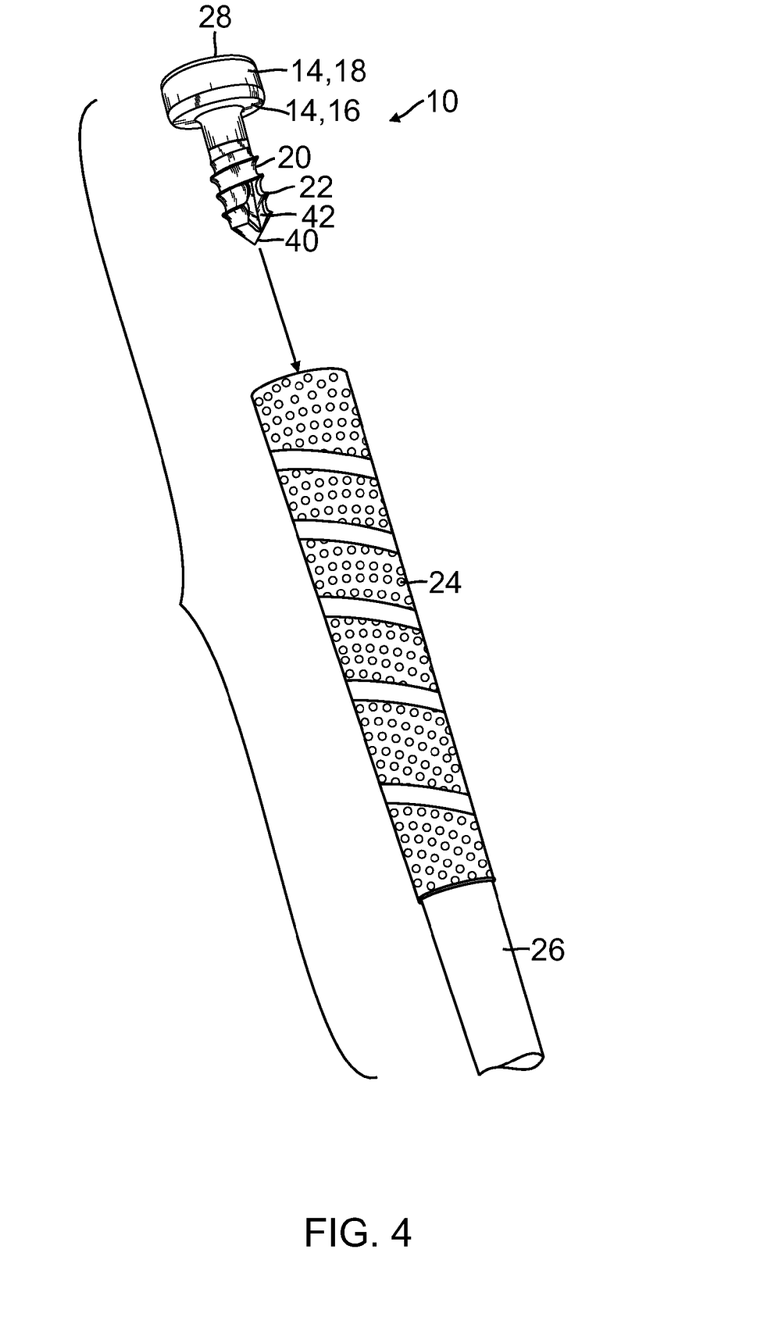
FIG. 4 is a perspective view of the structure of FIG. 1 about to be installed onto a club grip.
Figure 5:
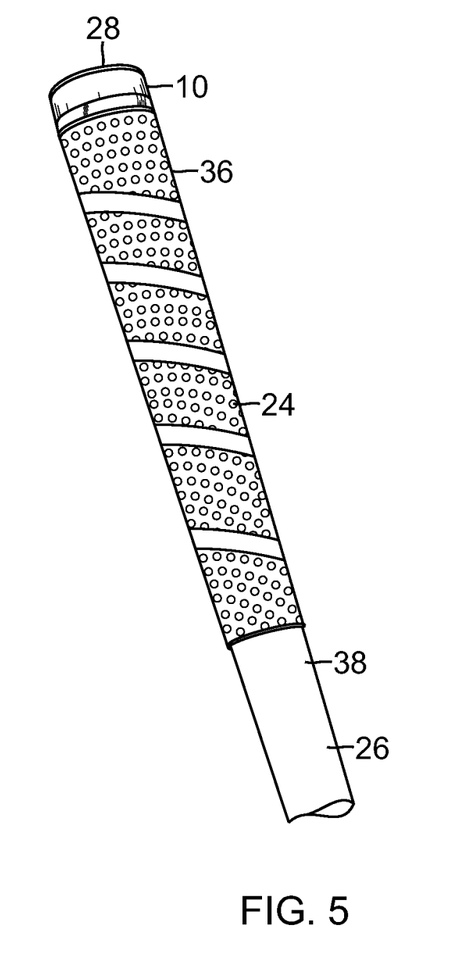
FIG. 5 is a perspective view of the structure of FIG. 1 installed onto a club grip.

FIG. 4 is a perspective view of the structure of FIG. 1 about to be installed onto a grip 24, and FIG. 5 is a perspective view of the structure of FIG. 1 already installed onto the grip 24. The magnetic retrieval device is simply screwed on the proximal end 36 of the grip 24 by penetrating and attaching to the rubber end of the club. Therefore, the golf club shaft 38, grip 24 and device 10 are all in alignment.

To facilitate ease of installation of the device 10 onto a golf club 26, the helical thread 22 may include a pointed end 40. The pointed end 40 is designed to pierce the proximal end 36 of the grip 24. The helical thread 22 may also include a thread-cutting screw type, such as a cutting slot 42. The cutting slot 42 helps to cut out the female side threads from the proximal end of the grip 24 such that the helical threads 22 of the device 10 can better engage the grip 24.

Figure 7:
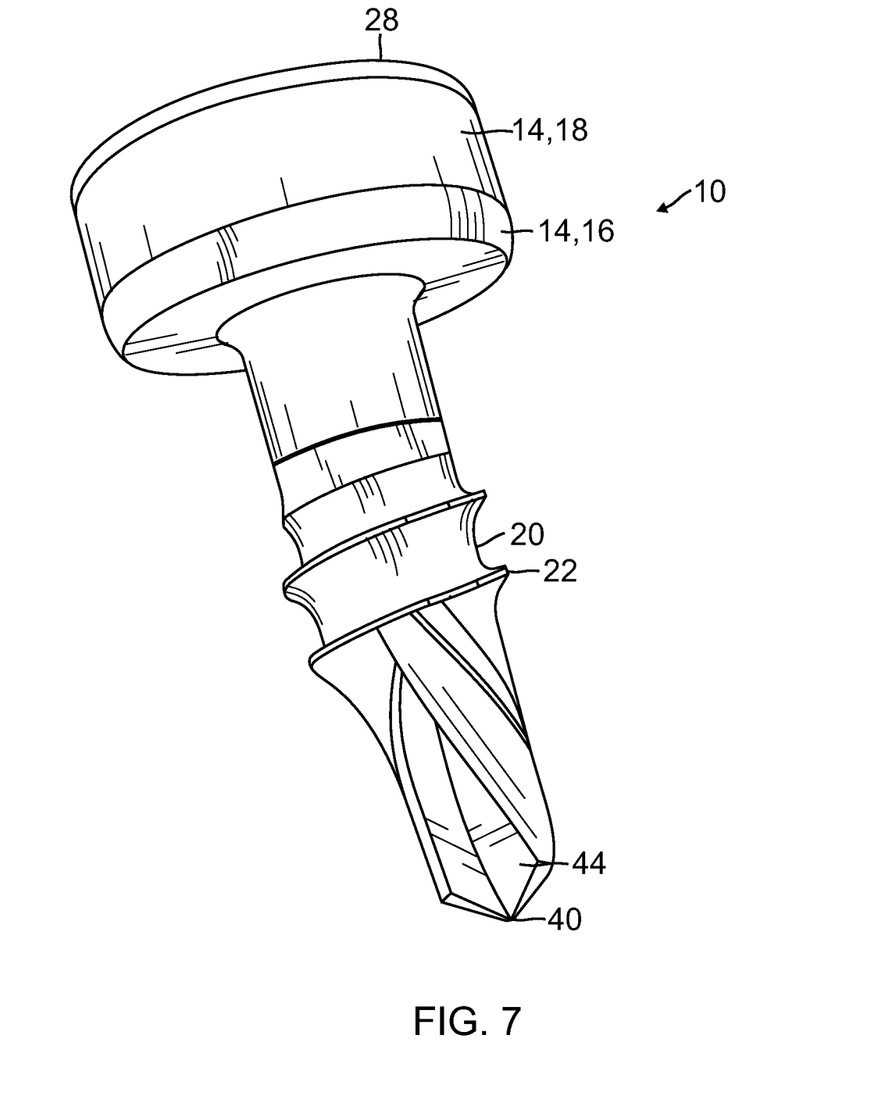
FIG. 7 is a perspective view of another exemplary magnetic retrieval device embodying the present invention.

FIG. 7 is a perspective view of another exemplary magnetic retrieval device 10 embodying the present invention. In this embodiment, the helical thread 22 may comprise a self-drilling thread type. The self-drilling thread type may include a drill distal end 44. The drill end 44 can penetrate much easier into the proximal end 36 of the grip 24 as compared to a blunt distal end of a screw 20. As can be seen by one skilled in the art, a variety of fastening features may be used to help screw the device 10 onto a grip 24 of a golf club 26, and this disclosure is not intended to limit it to just the precise forms disclosed herein.

Figure 6:
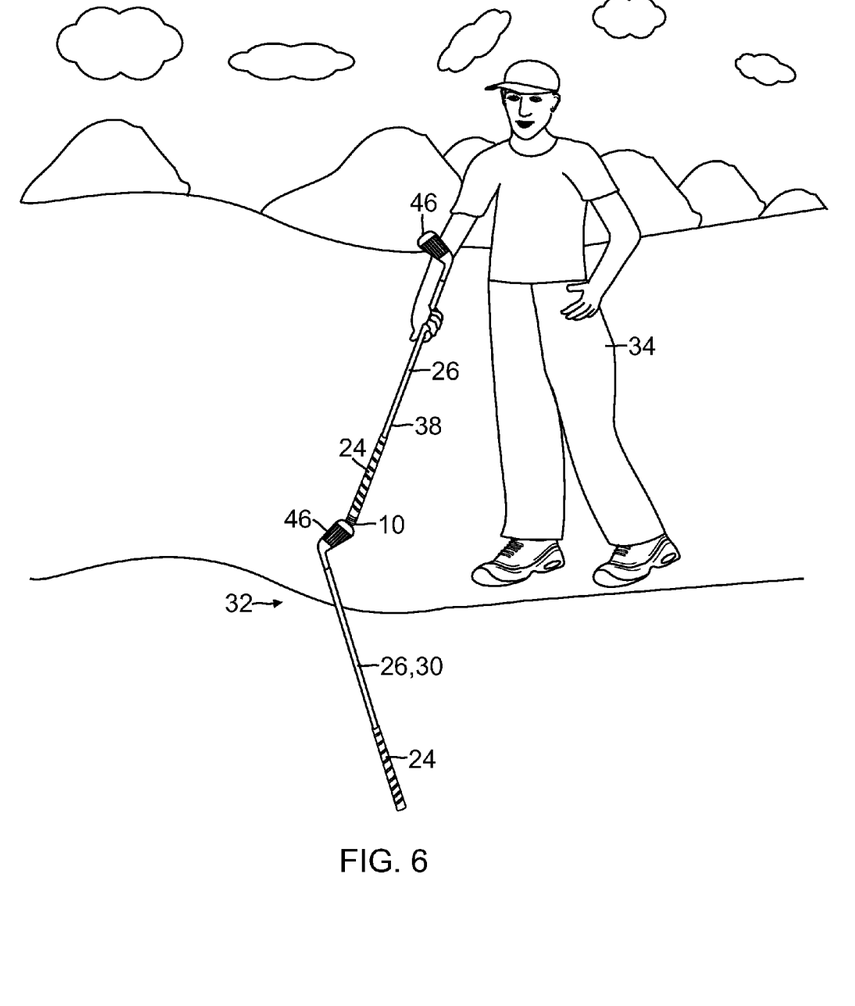
FIG. 6 is a perspective view of the structure of FIG. 5, illustrating how a golfer can pick up a club without bending over.

FIG. 6 is a perspective view of the structure of FIG. 5, illustrating how a golfer 34 can pick up a laying golf club 30 without bending over. A laying golf club 30 rests upon the playing surface 32. The method of picking up the laying golf club 30 includes attaching the magnetic retrieval device 10 to the proximal end 36 of the grip 24 of a golf club 26. The device 10 includes the magnet 12 fixed relative to a helical thread 22, where the device 10 is screwed onto the proximal end 36 of the grip 24 of the golf club 26. The method includes grabbing a club head end 46 of the golf club 26 and lowering the grip 24 and attached device 10 close to the laying golf club 30. This then allows the magnet 12 to attract the laying golf club 30. The method then includes picking up the laying golf club 30 without the need for a golfer 34 to bend over or bend down to retrieve the laying golf club 30.

The device 10 may also include a metallic ball marker 28 magnetically attached to the body 14, such that the ball marker 28 is removable for use to mark the position of a golf ball and can be retrieved from the playing surface using the device 10.

Figure 8:
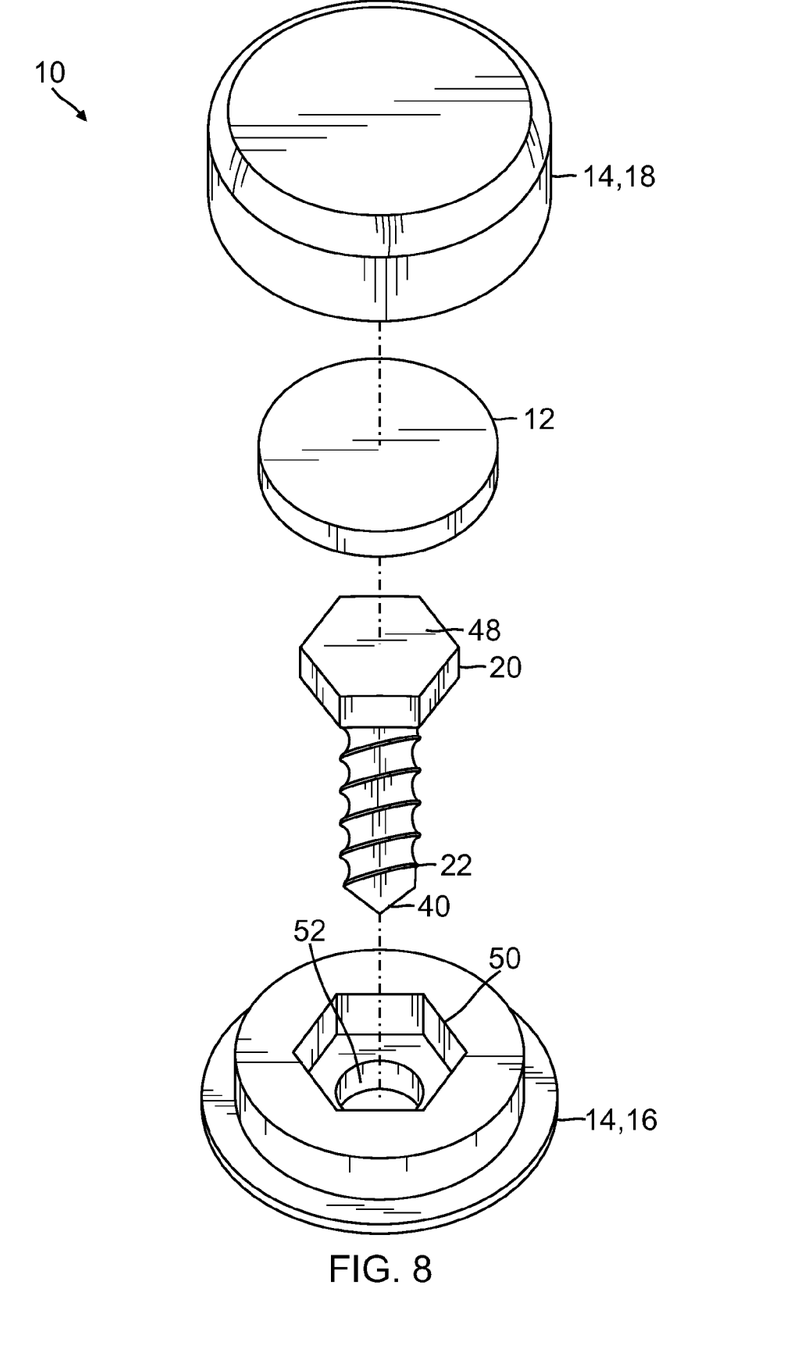
FIG. 8 is an exploded perspective view of another exemplary magnetic retrieval device embodying the present invention.
Figure 9:
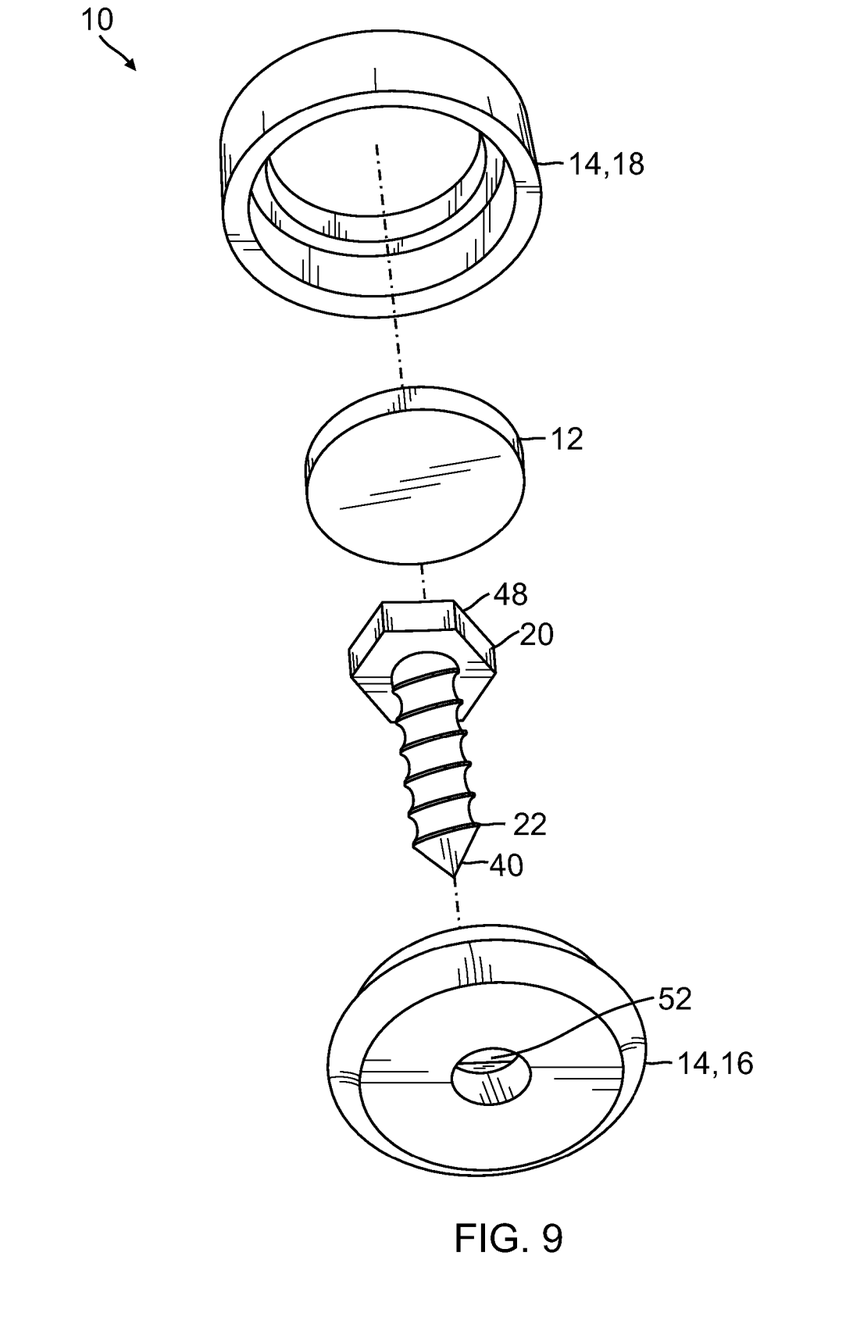
FIG. 9 is another exploded perspective view of the embodiment of FIG. 8.

FIG. 8 is an exploded perspective view of another exemplary magnetic retrieval device 10 embodying the present invention and FIG. 9 is another exploded perspective view of the embodiment of FIG. 8. In this exemplary embodiment, a magnetic retrieval device 10 utilizes a standard screw 20 in its assembly. The screw 20 has a hex head 48. The base 16 is configured to securely accept the hex head 48. The base 16 includes a hex-shaped recess 50 and an aperture 52. The hex head 48 of the screw 20 fits perfectly within the hex-shaped recess 50 of the base 16. This then secures the screw 20 relative to the base 16. The magnet 12 also is captured within the top 18. When the top 18, magnet 12, screw 20 and base 16 are bonded together, all the individual parts act as one unit. Then, a golfer 34 can grasp the device 10 and screw it into the proximal end 36 of a grip 24 of a golf club 26. To help a golfer 34 grasp the device 10, the top 18 may be made of a slip-resistant rubber or a comparable material.

In another exemplary embodiment the magnetic retrieval device 10 can also be attached to the end of a rake. A rake is a tool typically found in a sand trap along a golf course. A golfer 34 sometimes has hit their golf ball into the sand trap and must play the ball out of the trap. When doing this, the sand trap becomes disturbed. It is proper golf etiquette for a golfer 34 to fix the disturbed sand with a rake that is positioned near the sand trap or the golfer's 34 own rake. When doing this, it is typical for the golfer 34 to lay their golf club 26 down and then later need to pick it up. The device 10 is then used to retrieve the laying golf club 30.

The device 10 can also be attached to the end of a rake such that any golfer 34 can pick up the rake without bending over. When a golfer 34 approaches the device 10 attached to a rake, the golfer 34 can use any of his standard clubs to pick up the rake by simply placing his club head, which is metallic, near the device 10 attached to the end of the rake. The golfer 34 can then simply lift the rake and retrieve it without bending over. Alternatively, if the rake does not have a device 10 attached, the golfer can use his own device 10 attached to his golf club 26 to pick up the metallic end of the rake.

A rake may not have a grip 24 similar to a golf club 26. A rake may simply have an extended wooden handle. The device 10 can be screwed into a pre-drilled hole at the proximal end of the handle of the rake. Alternatively, the device 10 can be attached in a multitude of ways to the end of a rake. For example, the device 10 can utilize a clamp, bracket, fixture, nails, adhesive or other fastening means to attach to the end of a wooden handle. As can be seen by this disclosure and one skilled in the art, the device 10 can be attached to a multitude of tools in a multitude of ways to help a golfer 34 retrieve various metallic objects including golf clubs, rakes and ball markers.

Although several embodiments have been described in detail for purposes of illustration, various modifications may be made to each without departing from the scope and spirit of the invention. Accordingly, the invention is not to be limited, except as by the appended claims.

What is claimed is:

1. A magnetic retrieval device removably attachable to a grip of a golf club without the need of a tool, comprising:
   a magnet;
   a helical thread fixed relative to the magnet in non-movable relation; and
   a cylindrical surface fixed relative to helical thread and aligned with the helical thread, the cylindrical surface substantially the same diameter as the grip, where the helical thread is configured to be screwed directly onto a proximal end of the grip of the golf club without the need of the tool by gripping the cylindrical surface, wherein the golf club can be used by a golfer to retrieve a laying golf club already on a playing surface without the need for the golfer to bend over or bend down.

2. The device of claim 1, wherein the helical thread comprises a cutting slot for cutting threads when the device is screwed onto the proximal end of the grip of the golf club.

3. The device of claim 1, wherein the helical thread comprises a thread-cutting screw type.

4. The device of claim 1, wherein the helical thread comprises a self-drilling thread type.

5. The device of claim 1, wherein the helical thread comprises a drill distal end.

6. The device of claim 1, wherein the magnet comprises a rare earth magnet.

7. The device of claim 1, including a body surrounding the magnet.

8. The device of claim 7, wherein the body comprises an elastomeric material.

9. The device of claim 8, including a metallic ball marker magnetically attached to the body, such that the ball marker is removable for use to mark the position of a golf ball.

10. The device of claim 7, wherein the body comprises a base and a top, the base and top cooperatively configured to retain the magnet within.

11. The device of claim 10, wherein the helical thread is permanently attached to the base.

12. A magnetic retrieval device removably attachable to a grip of a golf club without the need of a tool, comprising:
    a body including an outer cylindrical surface substantially the same diameter as the grip of the golf club;
    a rare earth magnet disposed within the body; and
    a helical thread fixed relative to the body in non-movable relation and aligned with the outer cylindrical surface, where the helical thread is configured to be screwed directly onto a proximal end of the grip of the golf club without the need of the tool by gripping the outer cylindrical surface, wherein the golf club can be used by a golfer to retrieve a laying golf club already on a playing surface without the need for the golfer to bend over or bend down.

13. The device of claim 12, wherein the body comprises a base and a top, the base and top cooperatively configured to retain the rare earth magnet within.

14. The device of claim 13, wherein the top comprises an elastomeric material.

15. The device of claim 14, wherein the elastomeric material comprises rubber.

16. The device of claim 15, wherein the helical thread is attached to the base and the helical thread comprises a metallic material.

17. The device of claim 16, wherein the helical thread includes a cutting slot for cutting threads when screwed into the proximal end of the grip of the golf club.

18. A method of picking up a laying golf club already on a playing surface, the method comprising:
    attaching a magnetic retrieval device to a proximal end of a grip of a golf club without the need of an auxiliary tool, the device comprising a magnet and an outer cylindrical surface fixed relative to a helical thread in non-movable relation, where the device is configured to be screwed directly onto the proximal end of the grip of the golf club without the need of the auxiliary tool by gripping the outer cylindrical surface, the outer cylindrical surface substantially the same diameter as the grip;
    grabbing a club head end of the golf club;
    lowering the grip and attached device close to the laying golf club;
    allowing the magnet to attract the laying golf club; and
    picking up the laying golf club without the need for a golfer to bend over or bend down to retrieve the laying golf club.

19. The method of claim 18, including a body surrounding the magnet, where a portion of the body comprises an elastomeric material.

20. The method of claim 19, including a metallic ball marker magnetically attached to the body, such that the ball marker is removable for use to mark the position of a golf ball and can be retrieved from the playing surface using the device.

* * * * *